(12) United States Patent
Winter et al.

(10) Patent No.: US 9,819,845 B2
(45) Date of Patent: Nov. 14, 2017

(54) CAMERA MODULE FOR VEHICLE VISION SYSTEM

(71) Applicant: MAGNA ELECTRONICS INC., Auburn Hills, MI (US)

(72) Inventors: Hartmut Winter, Birstein (DE); Stefan Sauer, Waldaschaff (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/344,866

(22) Filed: Nov. 7, 2016

(65) Prior Publication Data

US 2017/0054882 A1 Feb. 23, 2017

Related U.S. Application Data

(63) Continuation of application No. 14/369,229, filed as application No. PCT/US2012/071219 on Dec. 21, 2012, now Pat. No. 9,491,342.

(60) Provisional application No. 61/653,665, filed on May 31, 2012, provisional application No. 61/583,381, filed on Jan. 5, 2012.

(51) Int. Cl.
*H04N 5/225* (2006.01)
*G03B 17/08* (2006.01)
*B60R 1/00* (2006.01)

(52) U.S. Cl.
CPC ............ *H04N 5/2252* (2013.01); *B60R 1/00* (2013.01); *G03B 17/08* (2013.01); *H04N 5/2254* (2013.01)

(58) Field of Classification Search
CPC ........................... H04N 5/2252; H04N 5/2257

USPC .......................................................... 348/373
See application file for complete search history.

(56) References Cited

U.S. PATENT DOCUMENTS

| | | | |
|---|---|---|---|
| 4,994,829 A | 2/1991 | Tsukamoto | |
| 5,550,677 A | 8/1996 | Schofield et al. | |
| 5,670,935 A | 9/1997 | Schofield et al. | |
| 5,949,331 A | 9/1999 | Schofield et al. | |
| 7,835,634 B2 | 11/2010 | Berend et al. | |
| 7,965,336 B2 * | 6/2011 | Bingle | B60R 11/04 348/149 |
| 8,044,776 B2 | 10/2011 | Schofield et al. | |
| 8,542,451 B2 | 9/2013 | Lu et al. | |
| 8,861,951 B2 | 10/2014 | Warren et al. | |
| 9,304,386 B1 | 4/2016 | Clement et al. | |

(Continued)

OTHER PUBLICATIONS

International Search Report and Written Opinion dated Mar. 15, 2013 for corresponding PCT Application No. PCT/US2012/071219.

*Primary Examiner* — Anthony J Daniels
(74) *Attorney, Agent, or Firm* — Gardner, Linn, Burkhart & Flory, LLP

(57) ABSTRACT

A method for assembling a vehicle vision system camera module includes providing rear and front housing portions, each having a respective mating surface and perimeter flange at least partially around the mating surface, with the perimeter flange having a securing surface opposite the first mating surface. With the mating surfaces at one another, a securing element is disposed along the perimeter flanges of the front and rear housing portions. First and second tabs of the securing element are bent to overlap and engage the respective securing surfaces of the respective perimeter flanges. The securing element is crimped at the perimeter flanges to urge the mating surfaces against one another to secure the rear housing portion relative to the front housing portion.

20 Claims, 19 Drawing Sheets

(56) References Cited

U.S. PATENT DOCUMENTS

| | | |
|---|---|---|
| 9,491,342 B2 | 11/2016 | Winter et al. |
| 2009/0069791 A1* | 3/2009 | Connolly ............ A61M 39/1011 604/533 |
| 2009/0244361 A1 | 10/2009 | Gebauer et al. |
| 2011/0310248 A1 | 12/2011 | McElroy et al. |

* cited by examiner

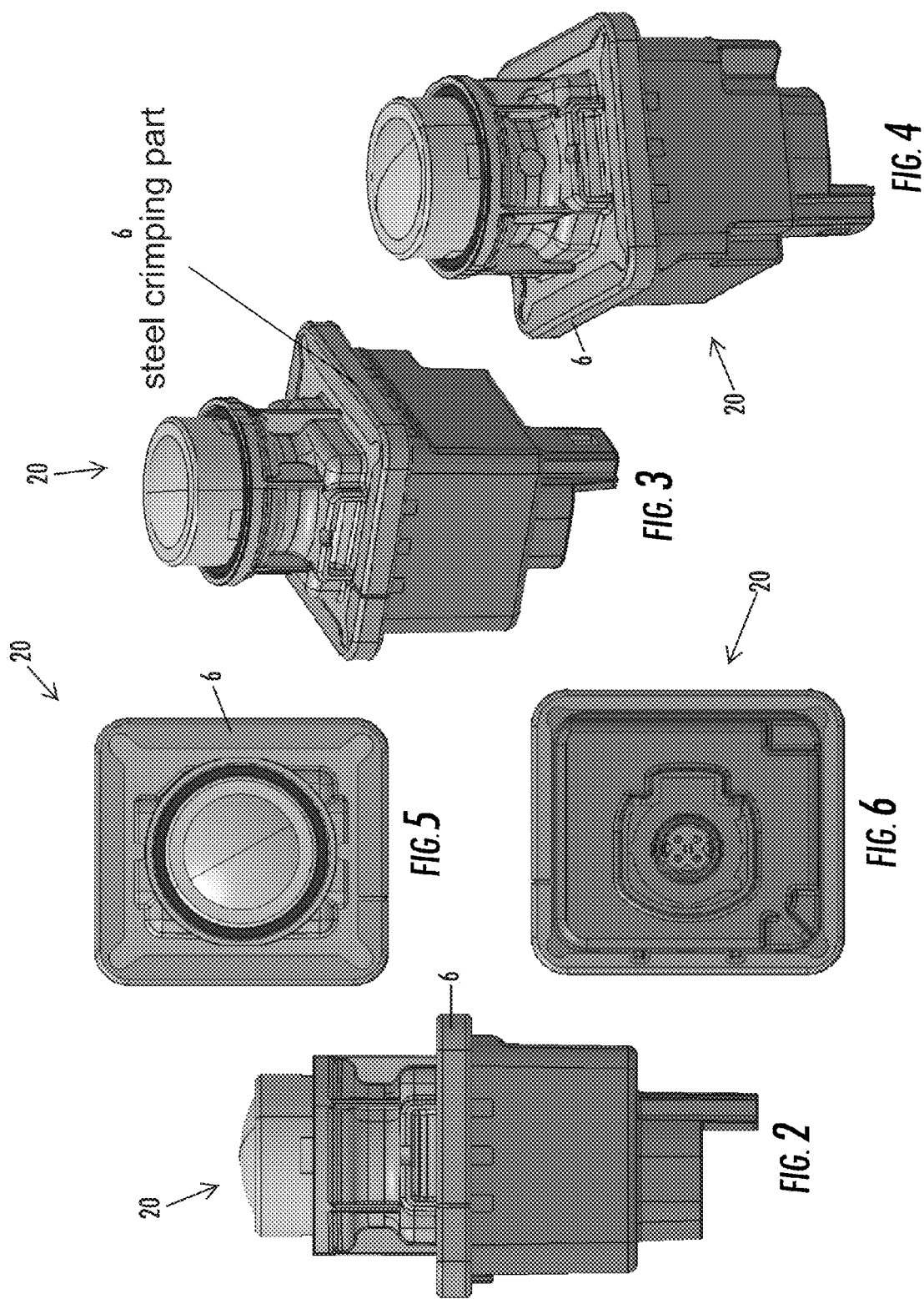

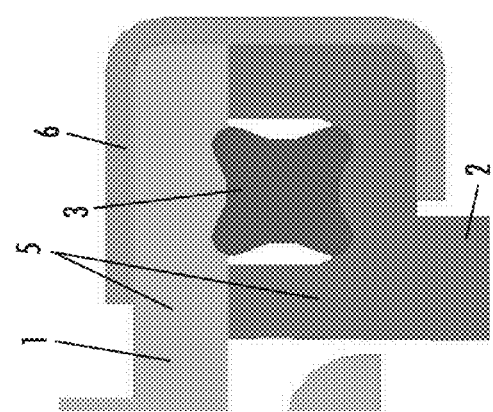
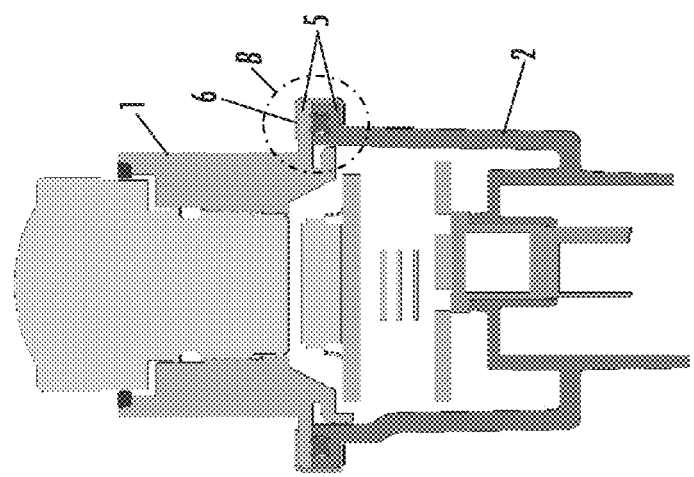
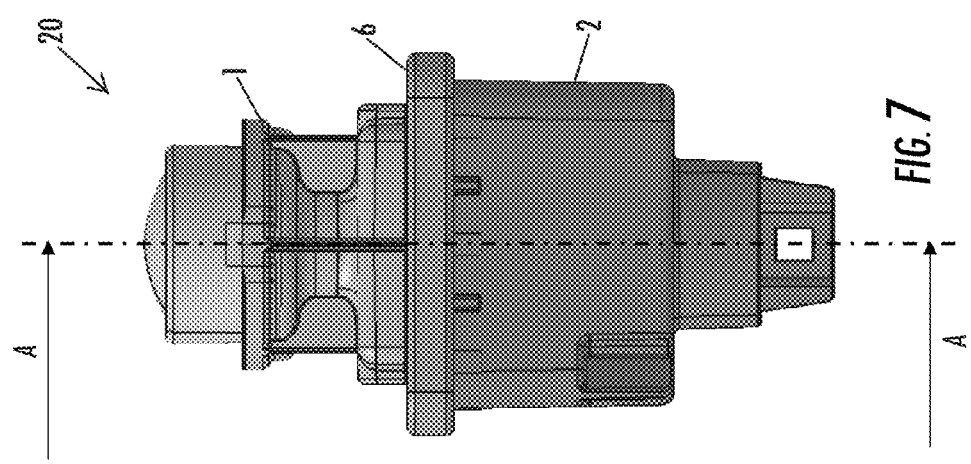

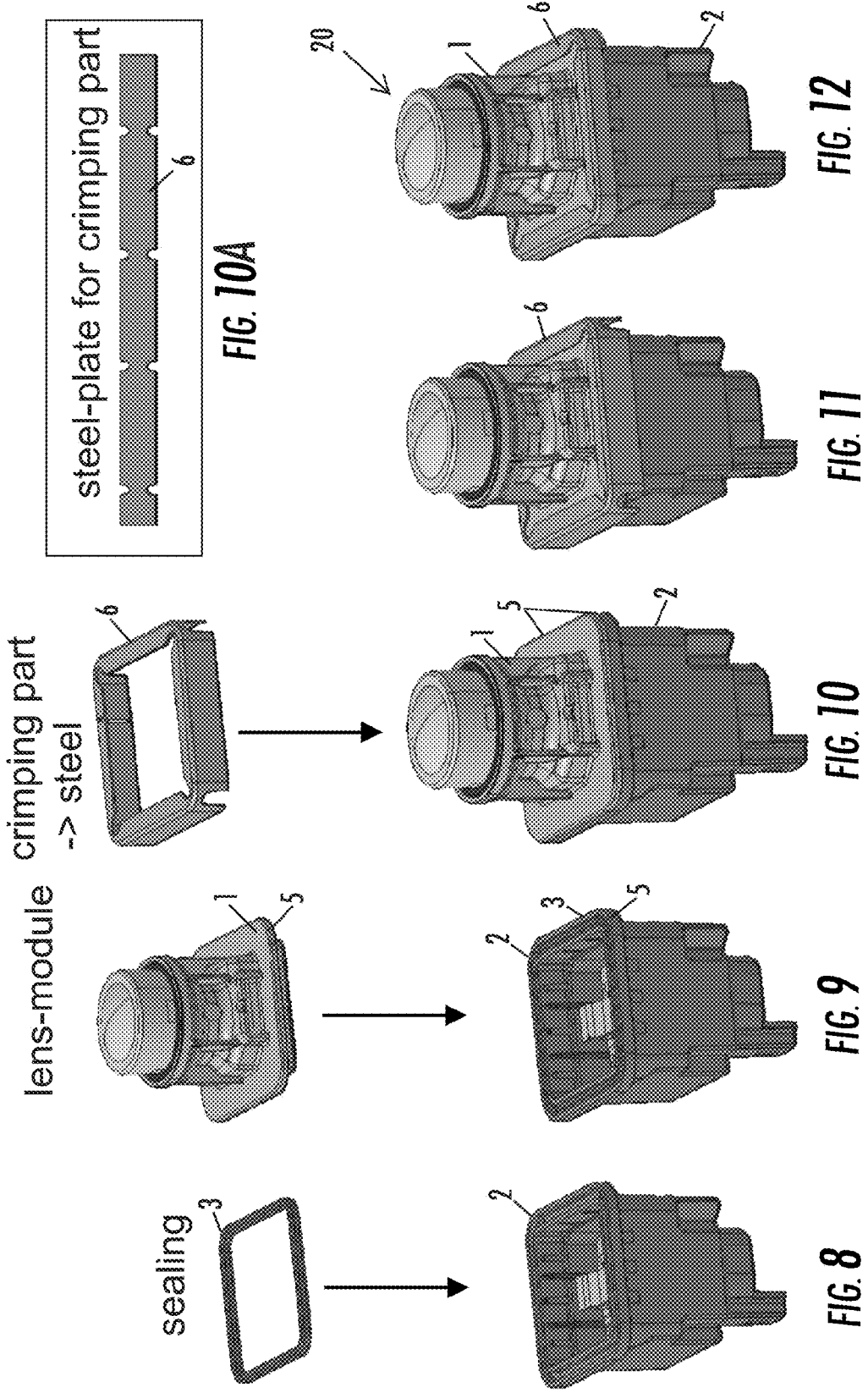

| Polymer-family | PBT-GF30 | PBT+PC (GF30) | PPS-GF40 | PPS-GF40-SF6 | zinc die casting metal | mg die casting metal |
|---|---|---|---|---|---|---|
| Trade name | Crastin HR5330HF | Xenoy Resin 6370 | Fortron1140L4 | Fortron1140L4-SF6 | Z410 | AZ91 |
| Producer | DuPont | Sabic | Ticona | Ticona | Dynacast | Dynacast |
| Density | 1500 | 1440 | 1650 | 2022 | 6700 | 1810 | kg/m³ |
| Thermal conductivity of melt | 0.28 | | 0.2 | 1.4 | 92 - 105 | 51 | W/(m K) |

6% steel fibers →

FIG. 17

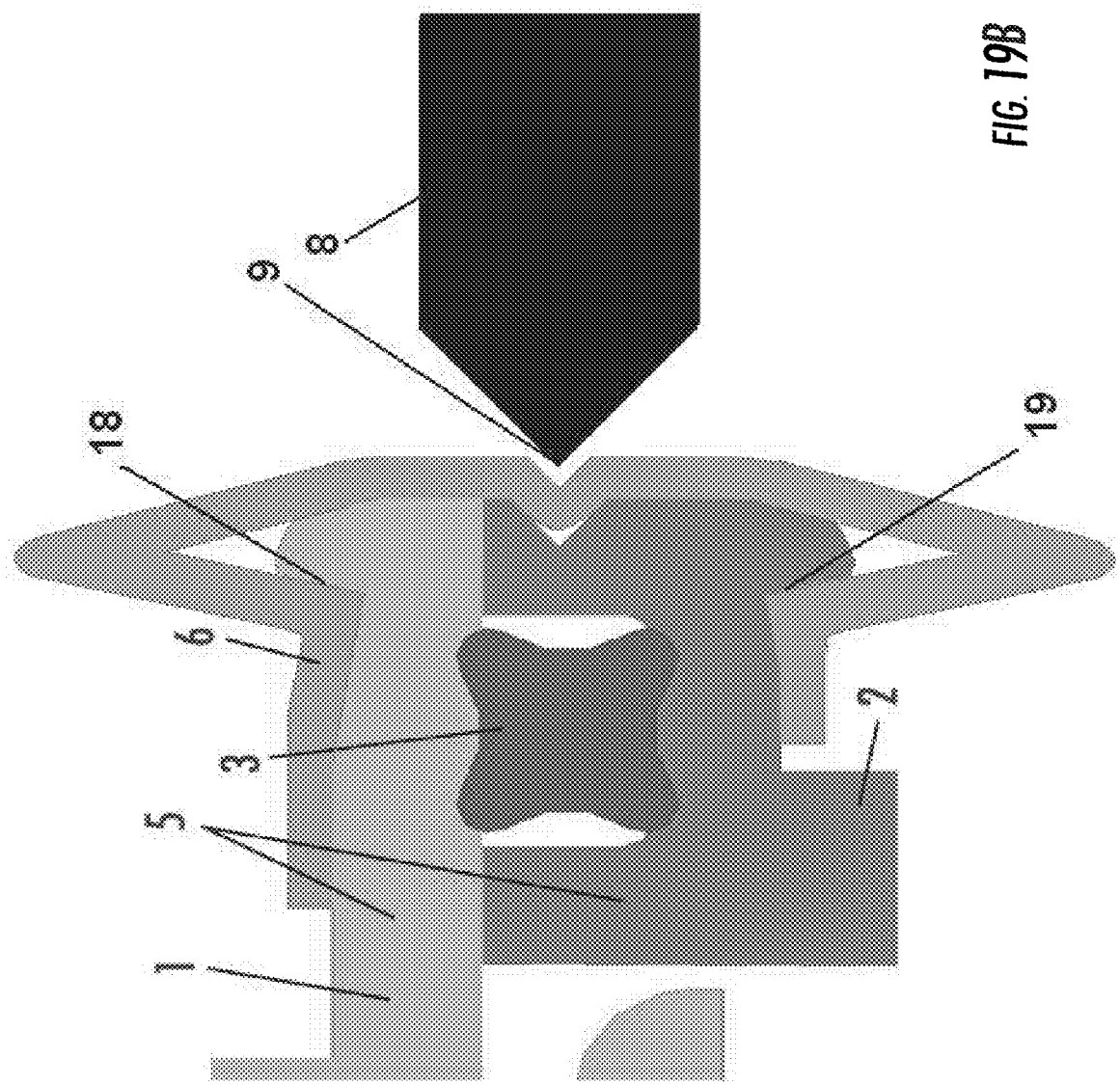

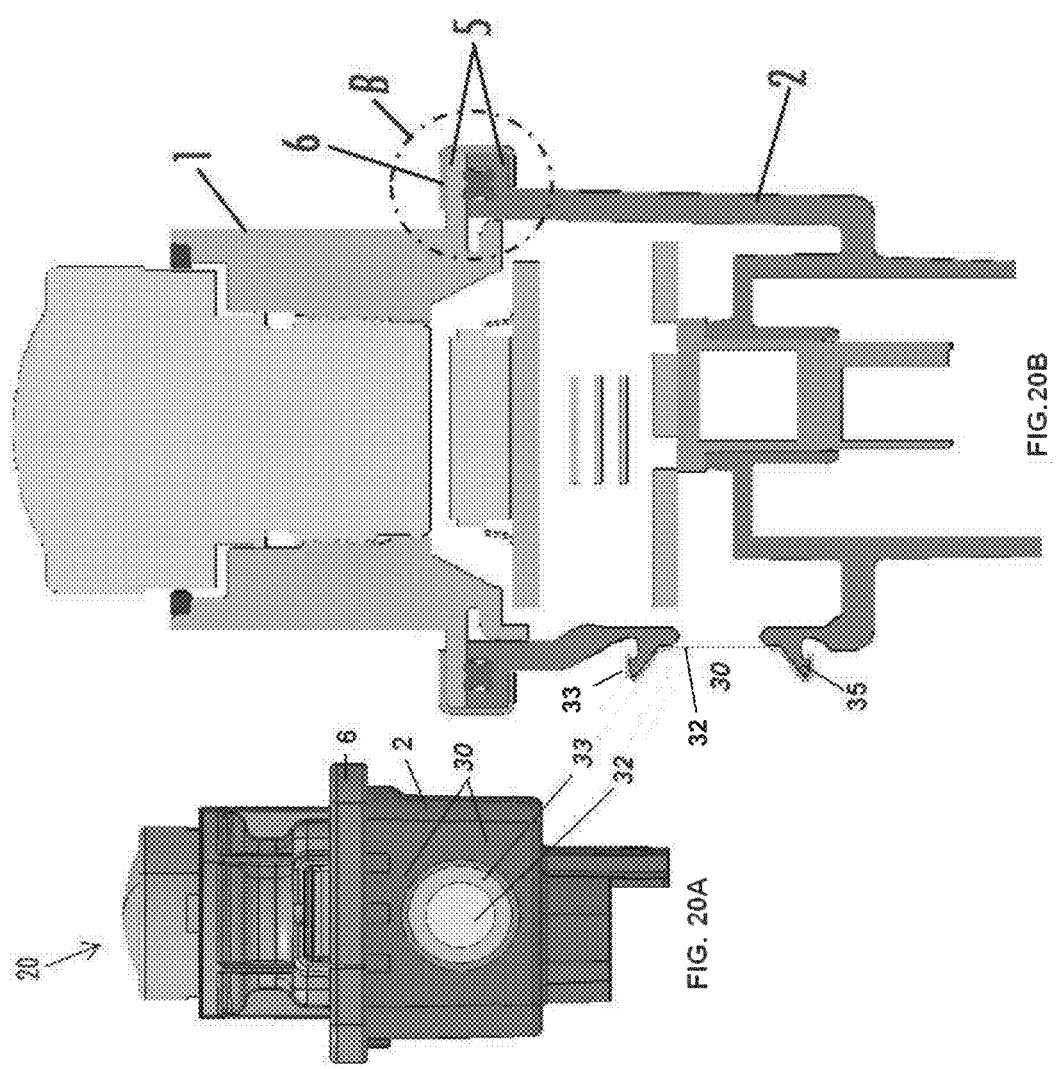

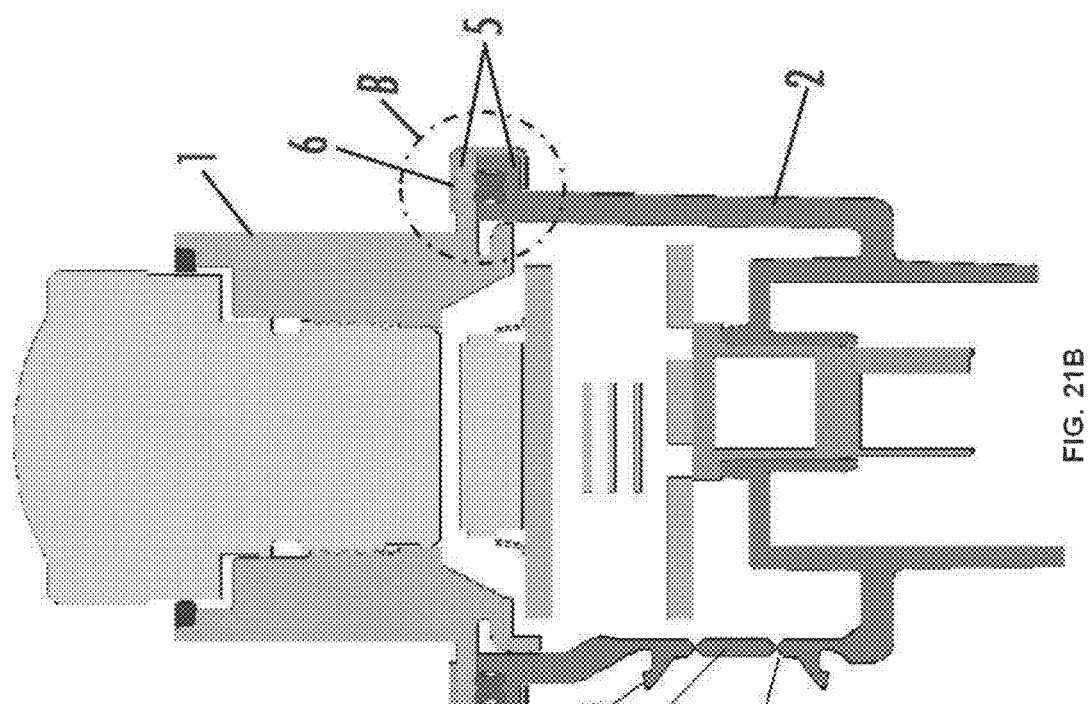
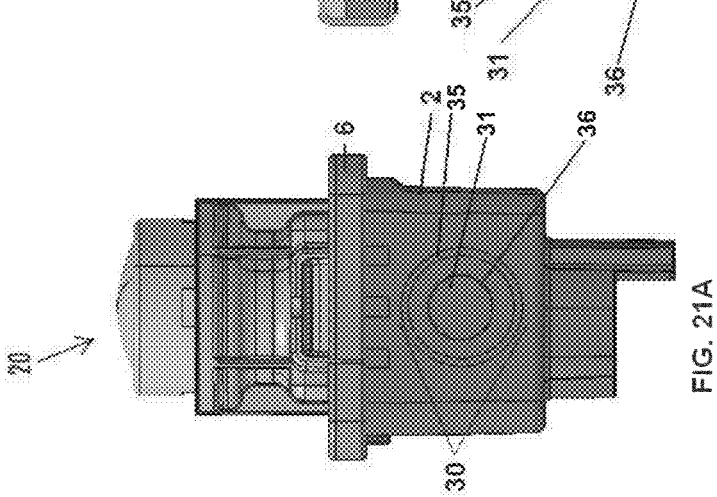
FIG. 21A
FIG. 21B

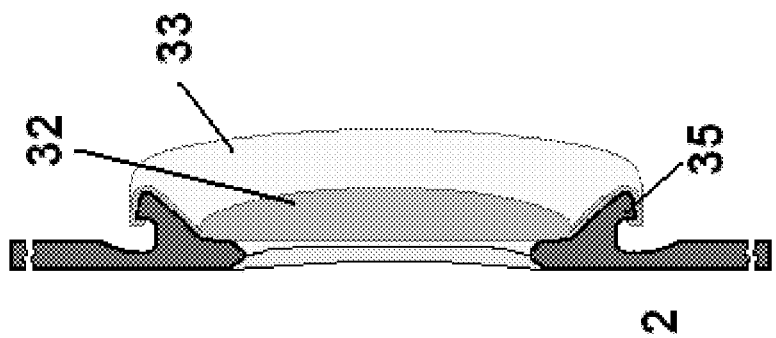
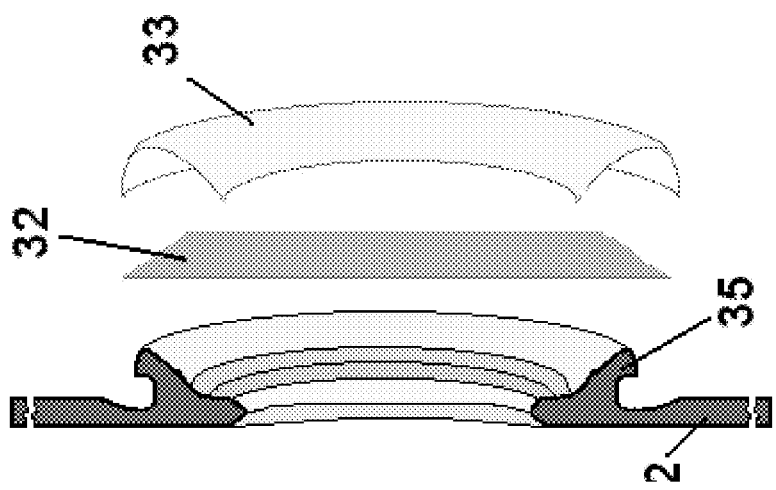

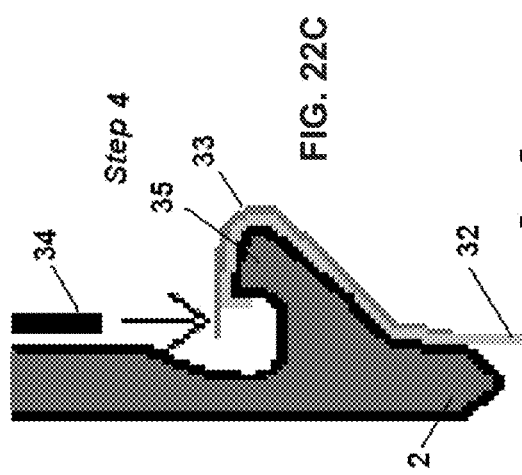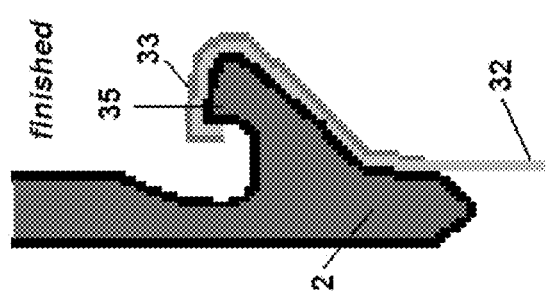

US 9,819,845 B2

CAMERA MODULE FOR VEHICLE VISION SYSTEM

CROSS REFERENCE TO RELATED APPLICATIONS

The present application is a continuation of U.S. patent application Ser. No. 14/369,229, filed Dec. 21, 2012, now U.S. Pat. No. 9,491,342, which is a 371 national phase filing of PCT Application No. PCT/US2012/071219, filed Dec. 21, 2012, which claims the filing benefits of U.S. provisional applications, Ser. No. 61/653,665, filed May 31, 2012, and Ser. No. 61/583,381, filed Jan. 5, 2012, which are hereby incorporated herein by reference in their entireties

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that may be displayed or processed to provide the desired display images and/or processing and control, depending on the particular application of the camera and vision or imaging system. The present invention provides a camera module for use in a vehicle vision system, and the camera module includes a lens holding portion sealed and secured relative to a circuitry holding portion. Optionally, an additional or alternative aspect of the present invention provides a breathable membrane portion of the camera assembly, where a break out portion may be removed from the camera's structure or body structure or housing to provide an opening or aperture or hole through the housing at which a breathable membrane (such as a breathable membrane that allows for escape of moisture from the camera housing while limiting or preventing ingress of moisture and/or contaminants from outside of the camera housing) may then be disposed at and secured at the camera structure.

According to an aspect of the present invention, a camera module is provided that is suitable for use in a vision system of a vehicle, where the camera module is disposed at a vehicle and has a field of view exterior of the vehicle, such as for capturing exterior view images for image processing and/or for displaying for viewing by a driver of the vehicle. The camera module comprises a housing portion and a lens holding portion. The housing portion at least partially houses circuitry of the camera module, and the housing portion comprises a first mating surface and a first perimeter flange around the first mating surface. The lens holding portion at least partially houses a lens assembly of the camera module, and the lens holding portion comprises a second mating surface and a second perimeter flange around the second mating surface. A sealing element is disposed between the first and second mating surfaces when the first and second mating surfaces are mated together, and a securing element is disposed along the first and second perimeter flanges and overlaps opposite surfaces of the first and second perimeter flanges to secure the housing portion relative to the lens holding portion.

Optionally, the securing element may comprise a single continuous metallic strip that is bent along the first and second perimeter flanges and that includes tabs that are bent to overlap the opposite surfaces of the first and second perimeter flanges. Optionally, the securing element comprises a plurality of metallic strips, with each of the metallic strips being disposed along a respective perimeter portion of the first and second perimeter flanges. Optionally, the securing element may comprise a single stamping part (or multiple stamping parts), which may be formed in a way that it can be disposed over the lens holder structure or the bottom structure to become aligned and covering both joints flanges and having open tabs that are bent to overlap the opposite surfaces of the first and second perimeter flanges.

These and other objects, advantages, purposes and features of the present invention will become apparent upon review of the following specification in conjunction with the drawings.

BRIEF DESCRIPTION OF THE DRAWINGS

FIG. 2 is a side elevation of a camera module for a vehicle vision system in accordance with the present invention;

FIGS. 3 and 4 are perspective views of the camera module of FIG. 2;

FIG. 5 is a lens end view of the camera module of FIG. 2;

FIG. 6 is a connector end view of the camera module of FIG. 2;

FIG. 7 is another side elevation of the camera module of FIG. 2;

FIG. 7A is a sectional view of the camera module taken along the line A-A in FIG. 7;

FIG. 7B is an enlarged sectional view of the area B in FIG. 7A;

FIGS. 8-12 are perspective views showing the process of assembling the camera module of the present invention;

FIG. 10A is a view of the unfolded crimping part metal strip (6) as being used in the process of assembling of FIGS. 8-12;

FIG. 17 is a table showing optional materials suitable for use in manufacture of the camera module housing and lens holder in accordance with the present invention;

FIGS. 19A and 19B show a similar assembly process as shown in FIGS. 18A and 18B, shown with the crimping parts having additional flanges and with the lens holder structure and the camera's bottom structure having additional grooves;

FIG. 20A is a side elevation of a camera module with a membrane attached at the bottom structure;

FIG. 20B is a sectional view of the camera module in FIG. 20A;

FIG. 21A is a side elevation of a camera module with a break out piece within the membrane area in FIG. 20A still intact (and attached at or formed with the bottom structure);

FIG. 21B is a sectional view of the camera module in FIG. 21A;

FIG. 22A is an enlarged perspective and sectional view showing the process step B in FIG. 22;

FIG. 22B is an enlarged perspective and sectional view showing a portion of the finished assembly F in FIG. 22;

FIG. 22C is an enlarged sectional view showing a portion of the camera module of the process step E in FIG. 22; and FIG. 22D is an enlarged sectional view showing a portion of the finished assembly F in FIG. 22.

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 1:
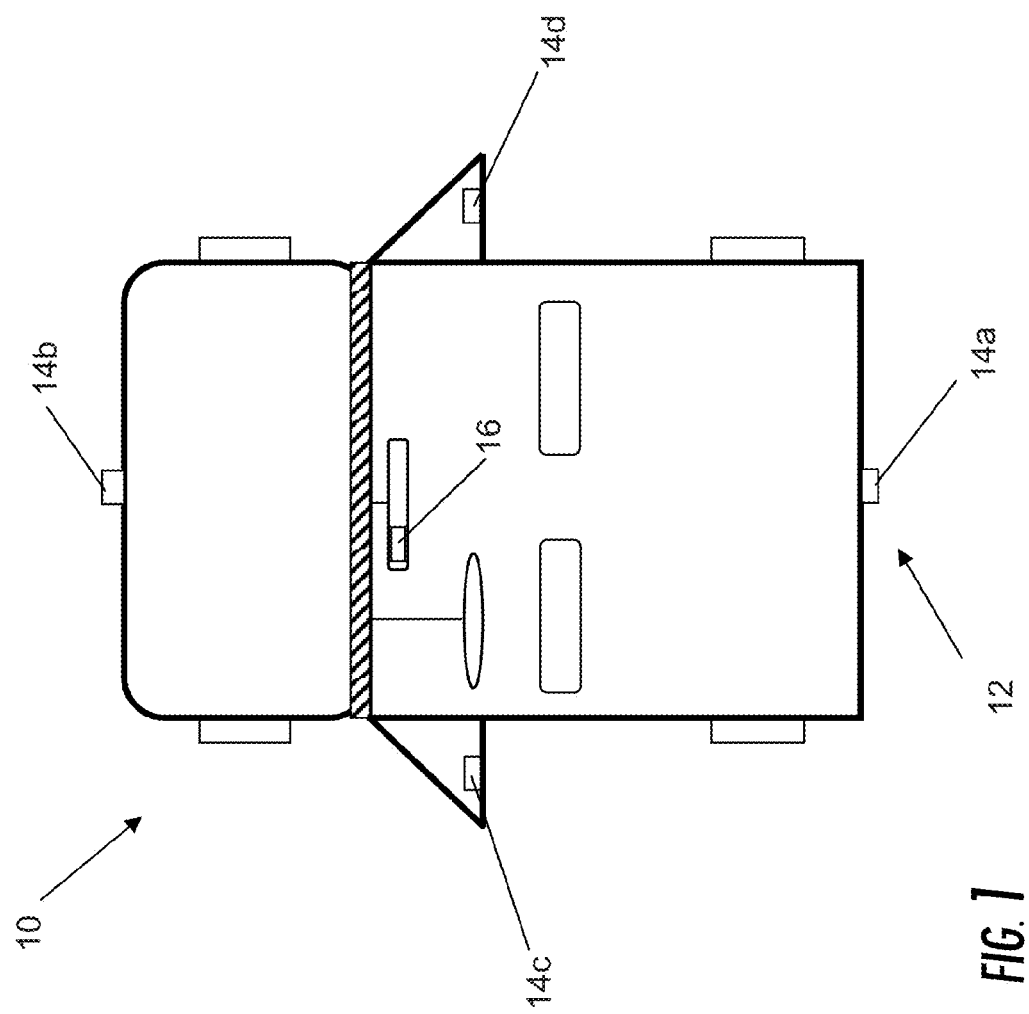
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like. The camera or cameras may comprise camera modules that have housing portions and lens holding portions that are mated and secured and sealed together, as discussed below.

Cameras for vehicle vision systems are typically assembled out of a bottom structure in which the imager chip is aligned in and a generally tube shape structure in which the lens system is fitted in (commonly referred to as a lens holder). The aligning of the lens holder with the bottom structure, especially the imager or imaging array, has to remain as steady as possible over the life time of the camera module. Misalignment is expressed in poor picture quality, which is dissatisfying for the customer.

It is known to manufacture the lens holder and the bottom structure out of laser welding capable plastic material (such as by utilizing aspects of the camera modules described in U.S. Pat. No. 7,965,336 and/or U.S. Publication No. US-2009-0244361, which are hereby incorporated herein by reference in their entireties). These can become joints by welding. A typical material for laser welding, so having an acceptable laser transparency, is a blend out of PPT and PC and/or the like.

Typically, the laser capable plastics (such as a blend out of PPT and PC and/or the like) may have some disadvantages, such as, for example:

The plastic may accumulate water so hydrogen becomes added to the plastic molecules, and this may influence the mechanical characteristics of the plastics, such as dimension alteration when accumulating hydrogen;

The strength may be limited, because such plastics may comprise porous materials;

In general, such plastics may be poor heat conductors, and the electronics generate heat, such that the heat has to be dissipated by the housing;

Another demand to camera electronic housings is EMC shielding, and typically this is achieved by coating a metallic or ferrite surface or using an inlay or by having steel pieces within the plastics. Such steel inserts are not desirable for laser welding, and the metallic coating or inserting an inlay requires additional processes or a two component tool, which may increase the manufacturing costs.

The improved camera module or housing or lens holder material of the present invention provides a bottom structure material that provides:

Improvement in heat conduction;

EMC capability;

Mechanical strength (over lifetime);

No dimensional changes over lifetime, especially in contact with water;

Reduced material cost;

Reduced process costs; and

Constant in quality within joining process.

The improved camera module of the present invention provides a joint of the lens holder and bottom structure that provides:

Capability for all lens holder and bottom structure materials;

No play, also under load;

Water/air tight seal;

Cost effectiveness to apply;

Low diminishing of joining force over lifetime or outer conditions; and

Low corrosion.

To achieve the goals of the present invention, a bottom structure or housing portion that comprises a metallic material is preferred. This could be steel, and optionally with an anti-corrosive protection, zinc plate, aluminum, iron, or other preferably cost effective metals. Such metallic material and metallic construction provides:
  enhanced heat conducting capabilities;
  enhanced EMC shielding capabilities;
  enhanced mechanical strength;
  reduced or low dimensional changes over lifetime;
  reduced or low dimensional changes by contact with water (if the corrosion protection is well); and
  reasonable costs in material and handling.

The body structure or housing may also be shaped or formed out of any suitable kind of metal forming, such as stamping, deep drawing and/or the like. For example, and with reference to FIG. 17, the lens housing and/or the bottom structure may comprise a PBT-I-GF30 material that is injection molded to the desired form (such as a PBT-I-GF30 material commercially available and marketed under the trade name Crastin SK605 NC010 or Crastin HR5330HF BK503 or the like), or the lens housing and/or the bottom structure may comprise a metallic material that is die cast (or otherwise formed or shaped) to the desired form (such as a magnesium die casting metal material commercially available and marketed under the trade name AZ91D, or a zinc die casting metal material commercially available and marketed under the trade name ZP0410, or the like), and may include a suitable surface coating or the like disposed thereat or thereon.

Figure 16:
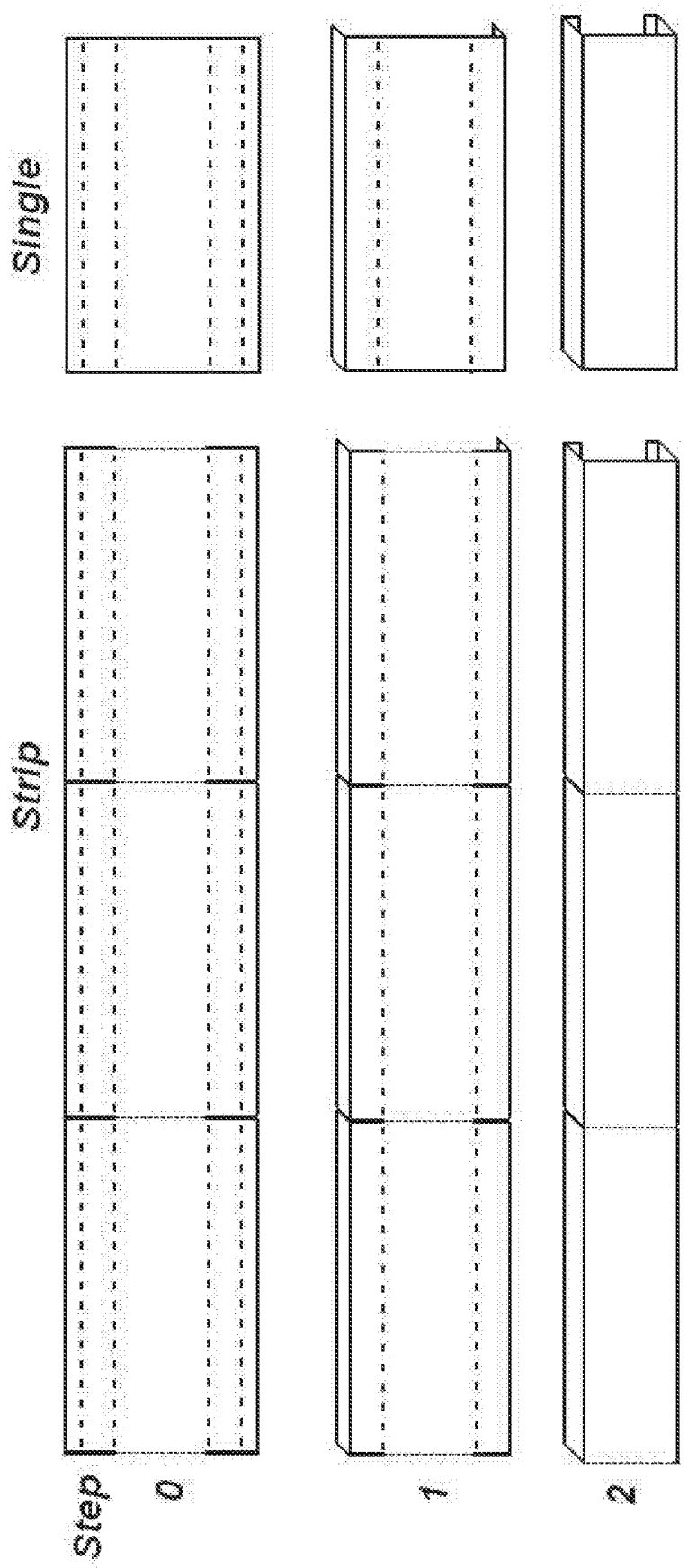
FIG. 16 is a view of the unfolded crimping part metal strip (6) as used in the process of assembling the camera as shown in FIGS. 13-15.

The present invention provides a camera module 20 that has a lens holder (LH) 1 joined with a housing portion or bottom structure (BS) 2 (FIGS. 1-7B). The camera module has matching surfaces or interface surfaces at the interface or junction of the LH and BS, such that, when engaged with one another, the LH and BS are substantially locked together to limit or substantially preclude relative rotation, tilting and transversal movement. The sides of both mating surfaces are made in a way that they align in parallel and have a lip 5 or groove for receiving a bendable strip or crimping part or retaining element 6 (see FIGS. 7A, 76, 10-12 and 15). The securing crimping part may comprise several stamping parts, or preferably a single stamping part. The crimping part may be made out of a plate with its center cut out (such as by cut stamping or the like) to free the space in the camera housing outer contour with that geometry formed in the same stamping step or in successive steps, such as shown in FIG. 16.

The crimping part is formed in a way that it can be disposed over the lens holder structure or the bottom structure so as to be aligned and covering both structures' flanges and having open tabs that are bent to overlap the opposite surfaces of the first and second perimeter flanges. The strip may be beaded or bent or formed around the lips or a pre-formed or pre-bent strip may be pressed over both lips from the side. The strip may be applied in one step or in several steps. The crimping strip may come from a continuous or endless strip or in single pieces or segments (see FIG. 16). The continuous or endless strip may have predetermined breaking or bending points which may be broken or bent before, during or after applying to the joint (see, for example, FIGS. 10 and 10A). The strip may be applied circumferentially around some or all sides of both structures. In order to dispense the crimping strip in such a manner, either the camera structure may be turned during the crimping or bending process or the strip applying appliance or device may turn or move around the stationary camera structure. The crimping strip may be applied on more than one side of the structures at one time. Optionally, grooves may be applied to the crimping strip after it is beaded or formed at or established onto the structures' lips, for adding joint or clamping or retaining force at the joint or junction of the housing portion and lens holding portion of the camera module.

Figure 13:
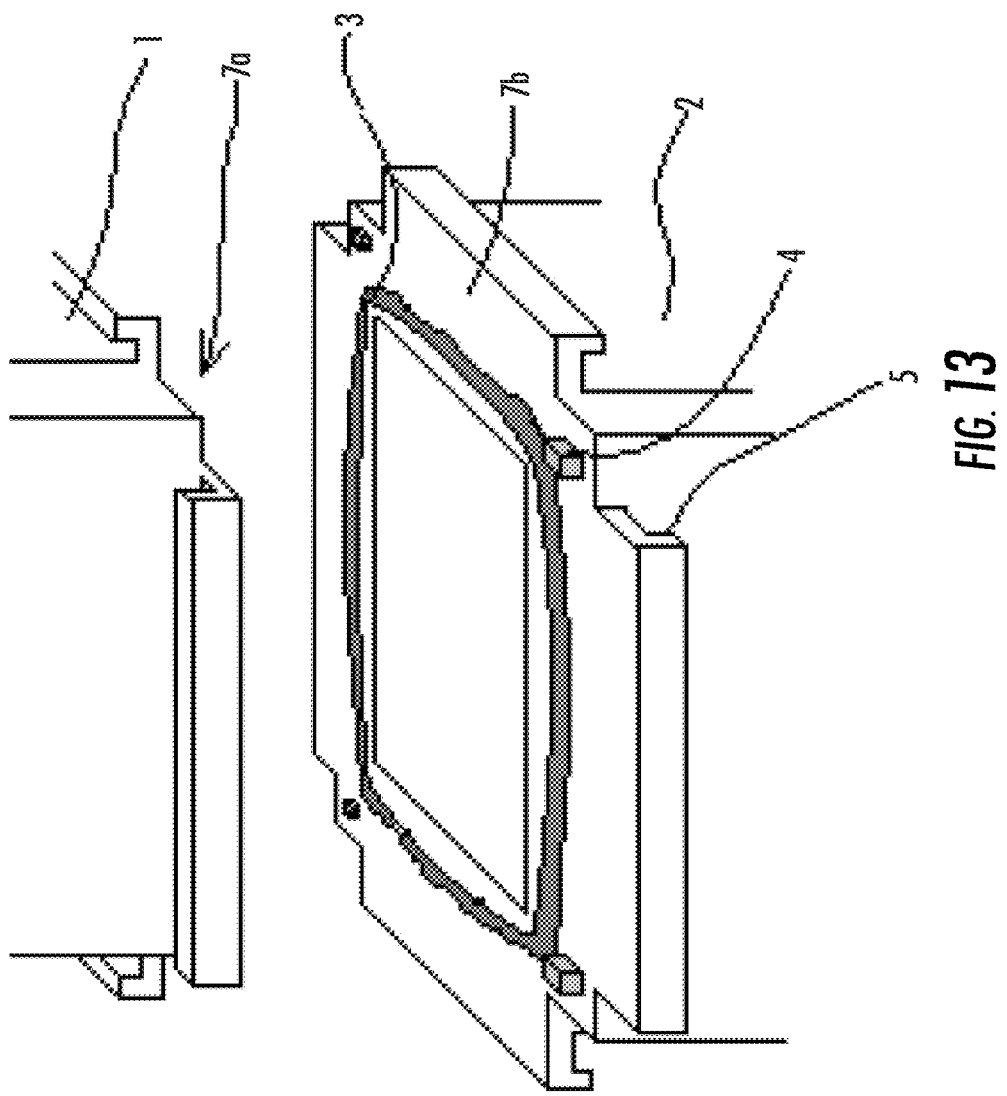
FIG. 13 is an exploded perspective view of an interface between a camera housing and lens holder in accordance with the present invention.

Preferably, there is a sealing element 3 disposed in between the mating surfaces 7a, 7b (FIG. 13) of the housing and lens holding portions. The sealing element may have a round shape in diameter or may be any suitable or desired shape. For example, the sealing may comprise an O-ring or the like. It may also be possible to have a four lip sealing in an X-shape configuration (see, for example, FIGS. 7A and 7B). The O-ring or X-ring sealing element (or other suitable sealing form) may be made out of any suitable material, such as a rubber or rubber like, elastic material, such as, for example, EPDM (Ethylene-Propylene-Diene-Monomer), FVMQ (Fluoroscone Rubber or Fluor-Silicon-Monomer) or VMQ (Silicone Rubber or Silicon-Monomer) or the like. These materials have different properties according temperature (FVMQ) and resistance to oil and fuels (VMQ and EPDM). These materials are commercially offered by ERIKS Holding Deutschland GmbH, Bielefeld, Germany, for example. Optionally, the sealing element may comprise a paste or dispensable substance and, more specifically, a fluid or thixotropic two component polyurethane foam or the like, that is applied by a dispenser. Commercial examples of such a dispensable sealing element include FIPFG from Wilhelm Kopp Zellkautschuk GmbH & Co. KG, Aachen, Germany (see, for example, http://www.koepp.de/wEnglisch/produkte/fipfg.php?navanchor=2110044).

Optionally, a groove or channel may be established at the surface of the mating surface of the LH and/or the BS to at least partially receive or absorb the sealing element in part so it saliencies into the gap in between both structures, or to suit the sealing in a shape for lying on the mating surface and not being able to evade or move under load. The LH, the BS or both may include accurate distance knobs or locating elements or aligning elements 4 (FIG. 13) inside or outside the sealing ring and generally surrounding the structure's center, in order to provide abutment points or projections and/or recesses for the defined alignment of the LH and BS. This reduces the influence of misalignment of the shape of the structures' mating surfaces.

Figure 14:
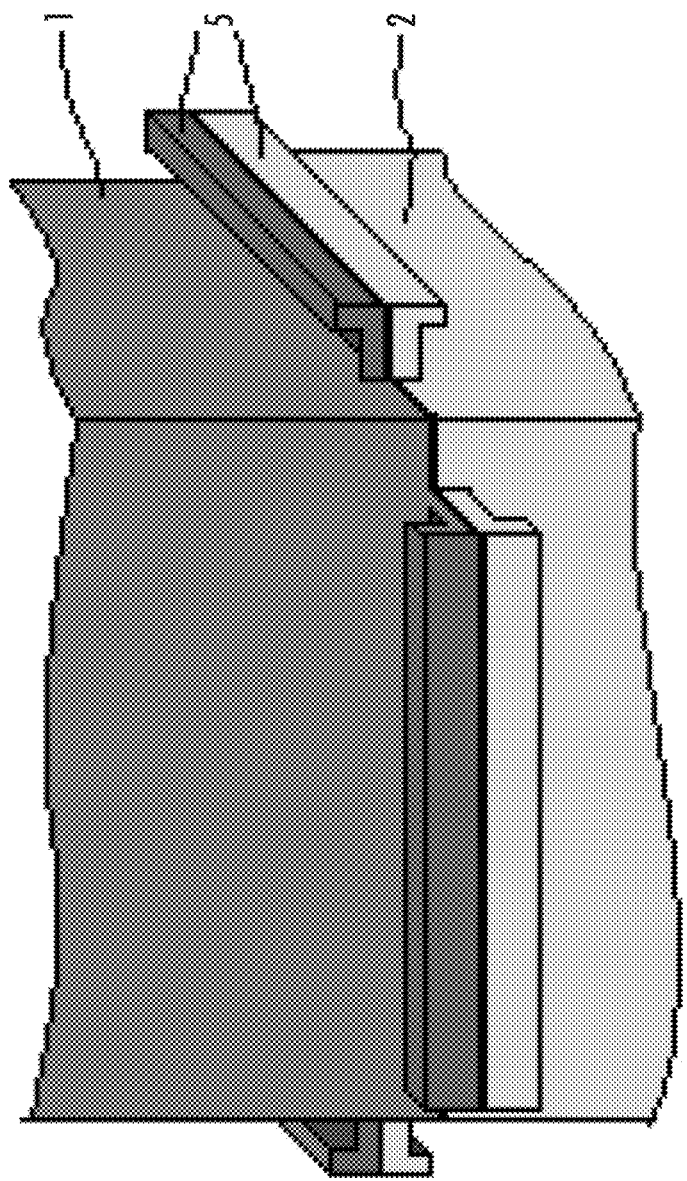
FIG. 14 is a perspective view of the camera housing and lens holder of FIG. 13, shown engaged with one another.
Figure 15:
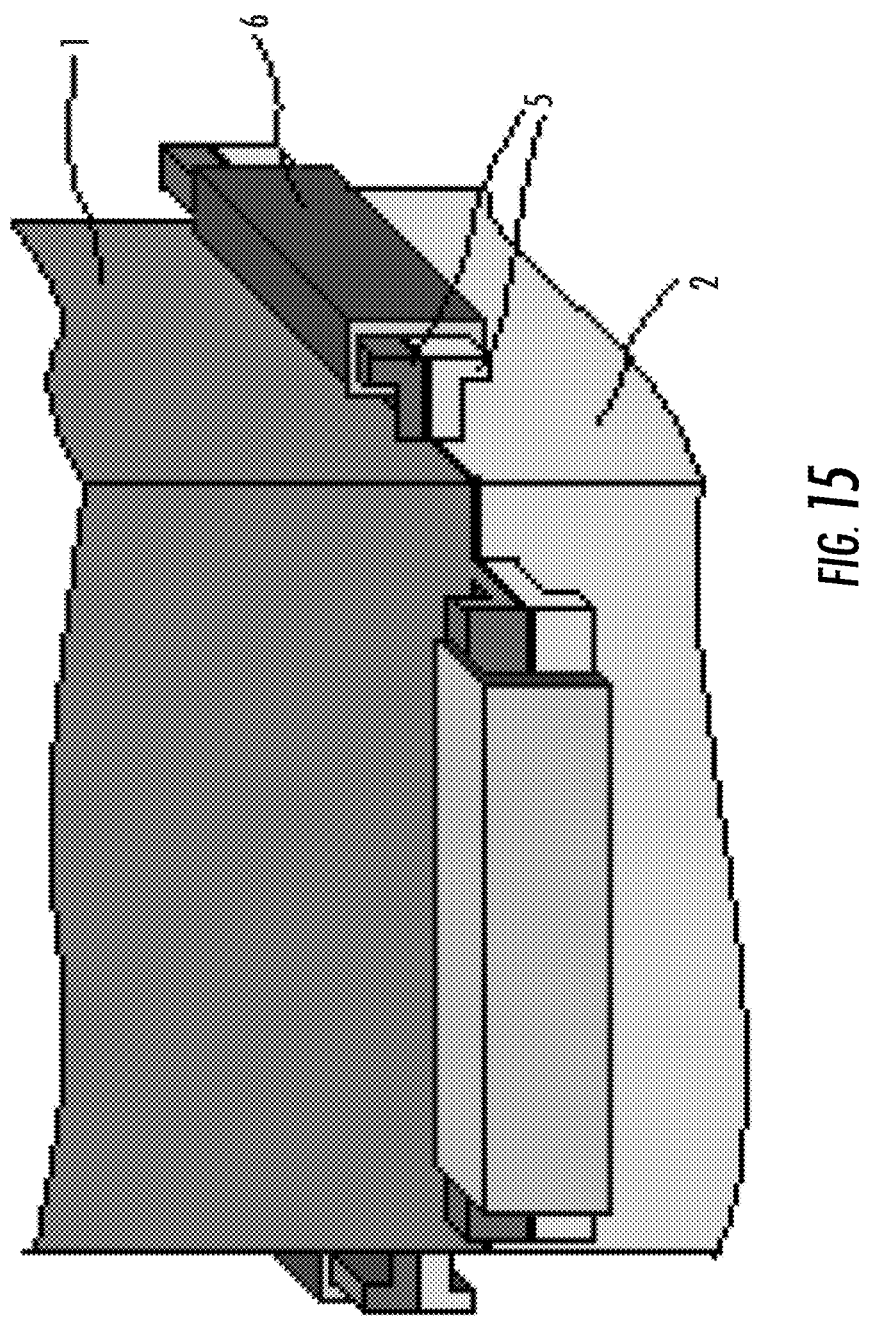
FIG. 15 is another perspective view of the camera housing and lens holder of FIG. 14, shown with crimped parts securing the housing and lens holder together in accordance with the present invention.

In the illustrated embodiment, the camera module includes the lens holder structure (LH) 1 and the bottom structure (BS) 2, having a groove within the surface 7b of the BS 2 to absorb or receive the sealing element 3 in part so the sealing element saliencies into the gap. The bottom structure may also have distance knobs 4 to enhance or facilitate accurate alignment of the bottom structure with the lens holder structure. The sides of the structures have lips 5 at their interfacing or mating surfaces. The LH 1 and BS 2 engage one another and are generally mated together or attached to each other (see FIGS. 9, 10 and 14), whereby the structures' lips 5 come into alignment. As shown in FIGS. 10-12 and 15, the beading or crimping strips 6 are applied to and crimped at least partially at or over the lips 5 to retain the LH and BS together.

Thus, and with reference to FIGS. 8-12, the camera module may be assembled by placing a seal or sealing element 3 at the camera housing or bottom structure 2 and mating the lens holder 1 with the bottom structure 2 so that the lips 5 of the lens holder 1 and bottom structure 2 are mated together at the junction or joint. The crimping part 6 is bent into the appropriate shape and disposed around the lips at the joint (the crimping part may be initially bent and then placed at the joint or may be bent and formed around the lips at the joint, while remaining within the spirit and scope of the present invention). As can be seen in FIGS. 10 and 11, the crimping part may be bent at notches to provide the right shape or form and to facilitate bending or folding of the tabs or wings at and over the lips of the lens holder and bottom structure to substantially secure the lens holder and bottom structure together. Thus, a center region of the crimping part or strip is disposed along the outer perimeter of the lips or flanges, with the tabs folded so as to overlap opposite surfaces of the lips or flanges. For example, and such as shown in FIGS. 10-12, the upper tabs of the strip are folded or bent so as to overlap an upper surface of the lip or flange of the lens holder, and the lower tabs are folded or bent so as to overlap a lower surface of the lip or flange of the bottom structure. Optionally, and such as can be seen in FIG. 7B, the tabs of the strip 6 may be dimensioned differently (with the upper tab being larger or wider than the lower tab in FIG. 7B) to accommodate the size and shape of the respective lips or flanges that the tab or tabs are overlapping when folded or bent to secure the lens holder to the bottom structure.

Figure 18A:
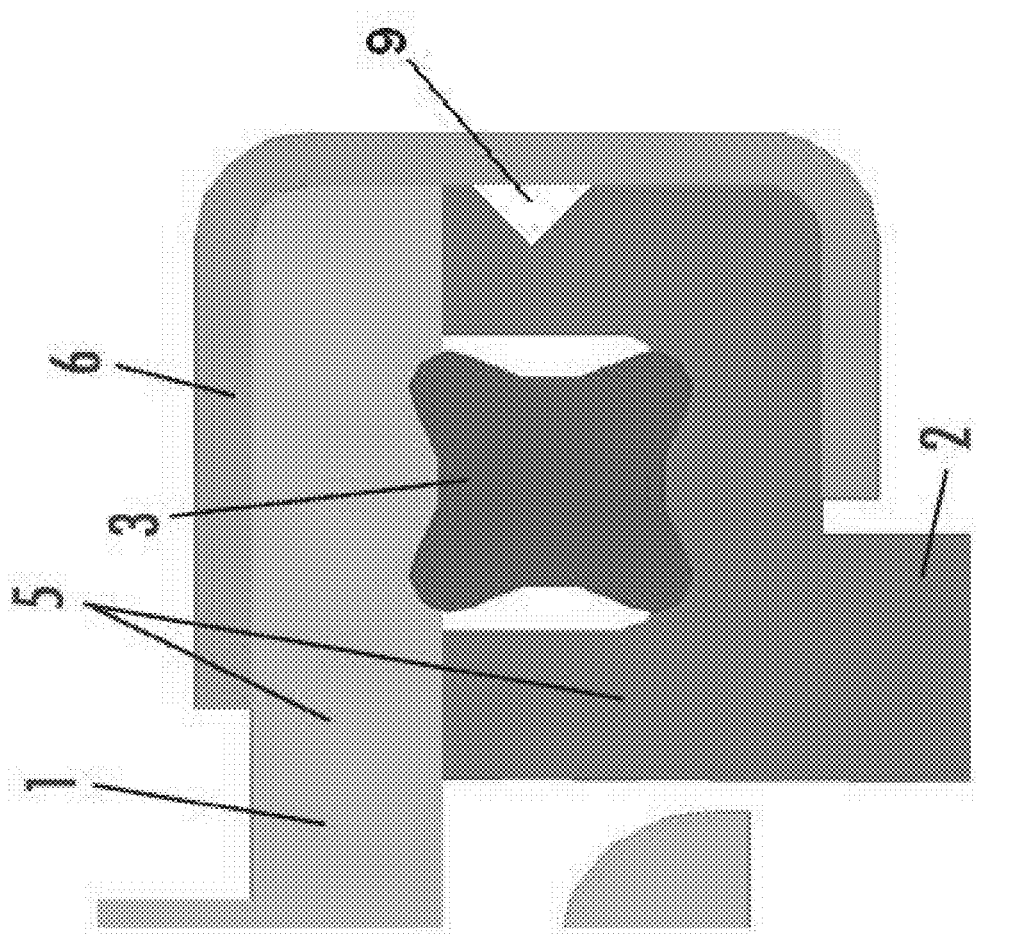
FIG. 18A is an enlarged sectional view similar to the one in FIG. 7B, showing an additional groove in the camera's bottom structure's wall that is covered by the crimping part.
Figure 18B:
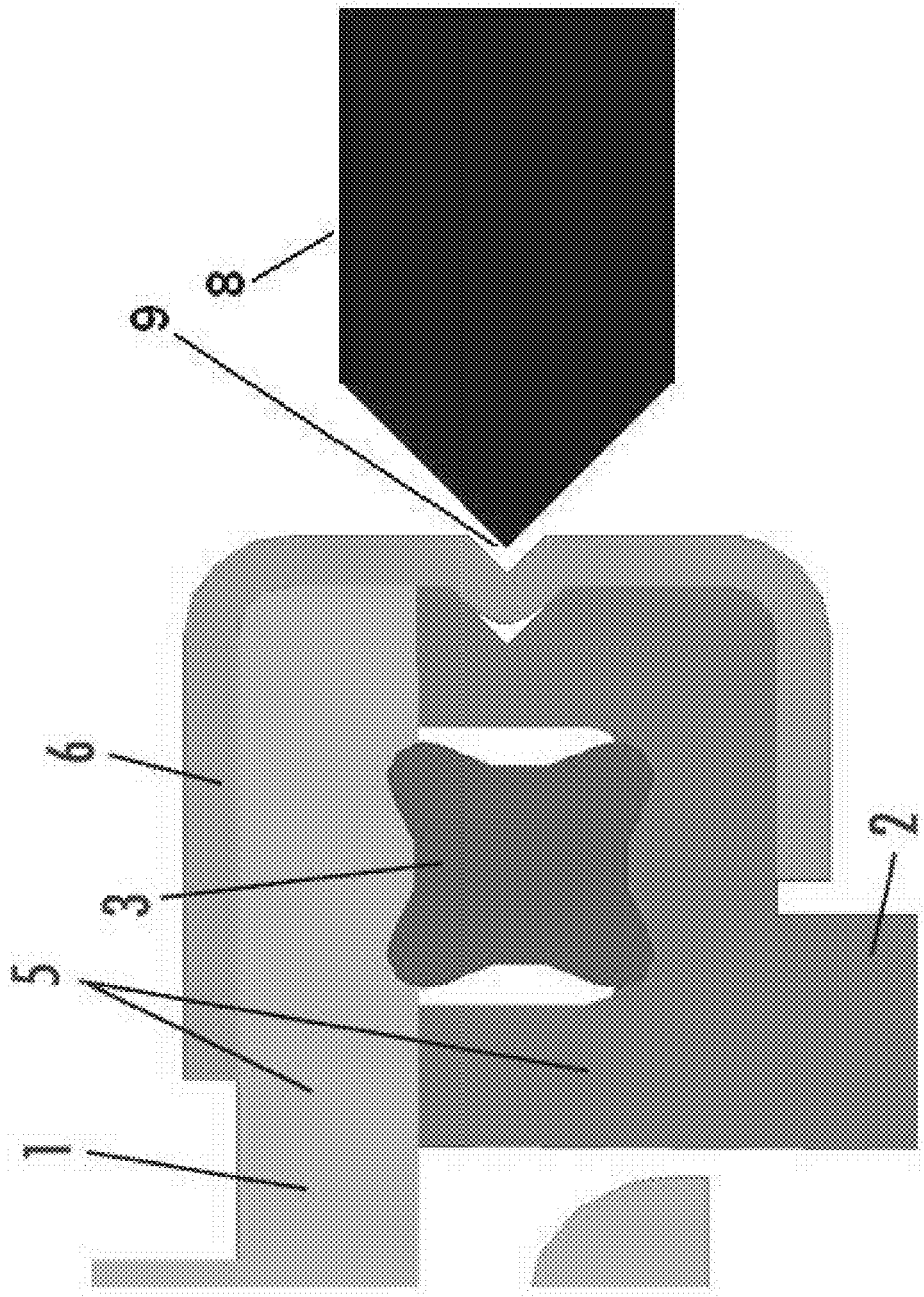
FIG. 18B is an enlarged sectional view of the crimping part of FIG. 18A, shown as it is punched or deformed into the groove at the camera's bottom structure by a stamping tool.
Figure 19A:
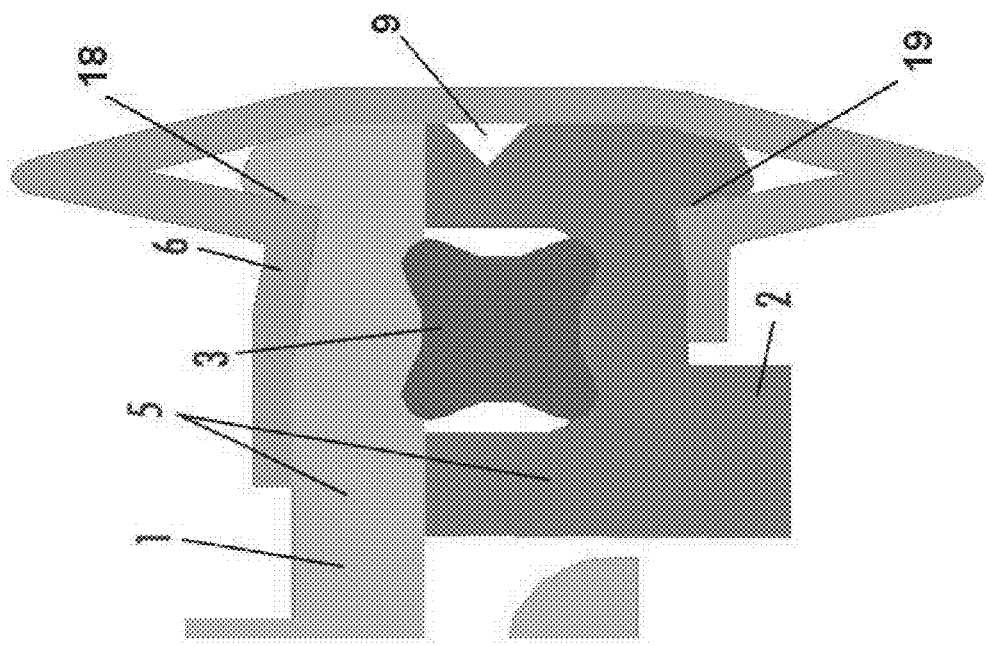
Figure 19C:
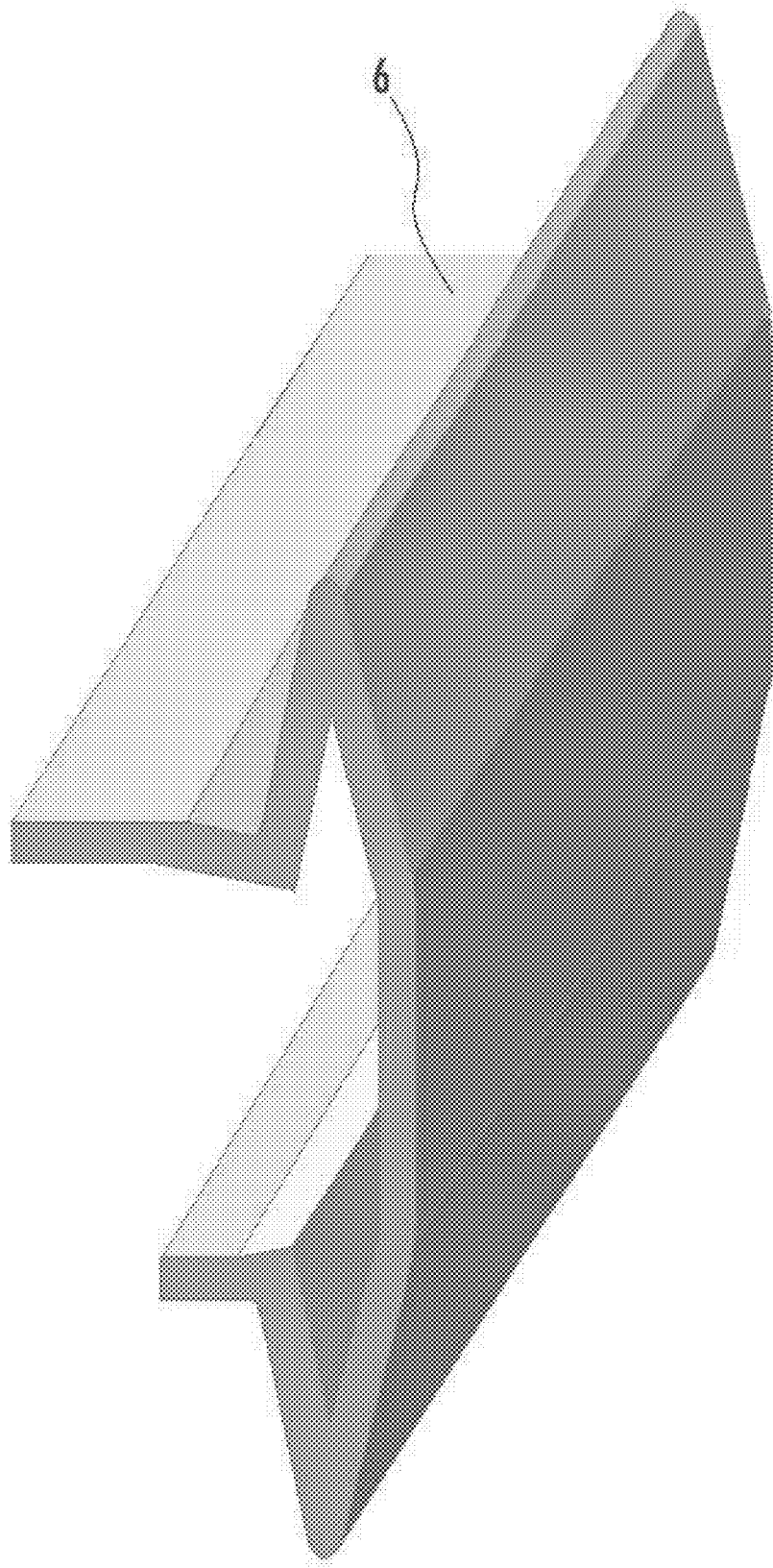
FIG. 19C shows a crimping part used in the assembly process of FIGS. 19A and 19B, before assembly of the crimping part to the camera structures and before punching a portion of the crimping part into the groove of the camera structure.

Optionally, and with reference to FIGS. 18A and 18B, the flanges or lips 5 that provide the mating surfaces of the camera housing or bottom structure 2 and lens holder 1 may comprise flanges that protrude radially outward from the respective structure and that may or may not have an additional lip protruding from the flanges for the crimping part to crimp over and around. Optionally, and as shown in FIGS. 18A and 18B, the camera structure 1 or 2 underneath the area where the crimping part or strip 6 is attached may have a groove 9 established thereat (the exemplary assembly shown in FIGS. 18A and 18B shows the groove in bottom structure 2, but a similar groove may also or otherwise be established at the lens holder 1). As an additional assembly step, and after the crimping part is folded or bent at least partially over and around the flanges or lips 5, the crimping part or strip 6 may be punched into the groove 9 by a stamping tool 8, such as shown in FIG. 18B. By that the strip is bent and stretched, adding force at the strip's edges in the direction towards the center of the strip, with the force transmitted to the lens holder structure's flange and the bottom structure's flange, thereby tightening the linkage by clamping the bottom structure's flange against the lens holder structure's flange. Optionally, and as a more sophisticated variant of the option of FIGS. 18A and 18B, and such as shown in FIGS. 19A and 19B, a groove 18 may be established at the flange of the lens holder structure 1 and a groove 19 may be established at the flange of the bottom structure 2, where the grooves 18, 19 may come into use for at least initially securing the crimping part at the structures 1, 2 and limiting or substantially precluding the crimping part 6 from slipping off, while improving the insertion or application of the tightening forces (by bumping in the groove 9) over the structures flanges. Such a crimping part or strip 6 is shown in FIG. 19C.

Optionally, and as an additional or alternative aspect of the present invention, and with reference to FIGS. 20A and 20B, the vehicle camera 14 may include an additional structural element 30 that is established at a location that is meant to be the place for an optional attachable membrane 32. The structural element 30 may be part of the lens holder structure 1 or preferably part of the bottom structure 2 (such as shown in FIGS. 20A and 20B). The structural element 30 (FIGS. 21A and 21B) may be produced by the same tool together with the rest of the structure, especially when the structure is made by injection molding. As shown in FIGS. 21A and 21B, the structural element 30 may comprise a predetermined breaking zone or frangible portion 36 meant for breaking to detach a removable element or lid 31 from the housing portion before assembling the whole camera, in order to open a space/hole, preferably in a round shape, for assembling a membrane 32. For example, the breaking zone 36 may be a narrowed or thin material portion of the housing and may circumscribe the removable element 31, whereby, when the breaking zone 36 is broken, the removable element 31 is removed from the housing portion to establish an opening or aperture therethrough. After the removable element 31 is removed, the membrane may be disposed at the aperture and secured or retained thereat. The breathable membrane 32 may comprise any suitable breathable thin membrane-like material, such as, for example, a GORE-TEX® material or the like. Such membrane materials are known to being used for releasing air and its containing water, vaporized in the air, while sealing to limit intrusion of liquids (including water) and dust, in order to keep the camera housing's inside dry and free from pressure due to temperature changes.

Figure 22:
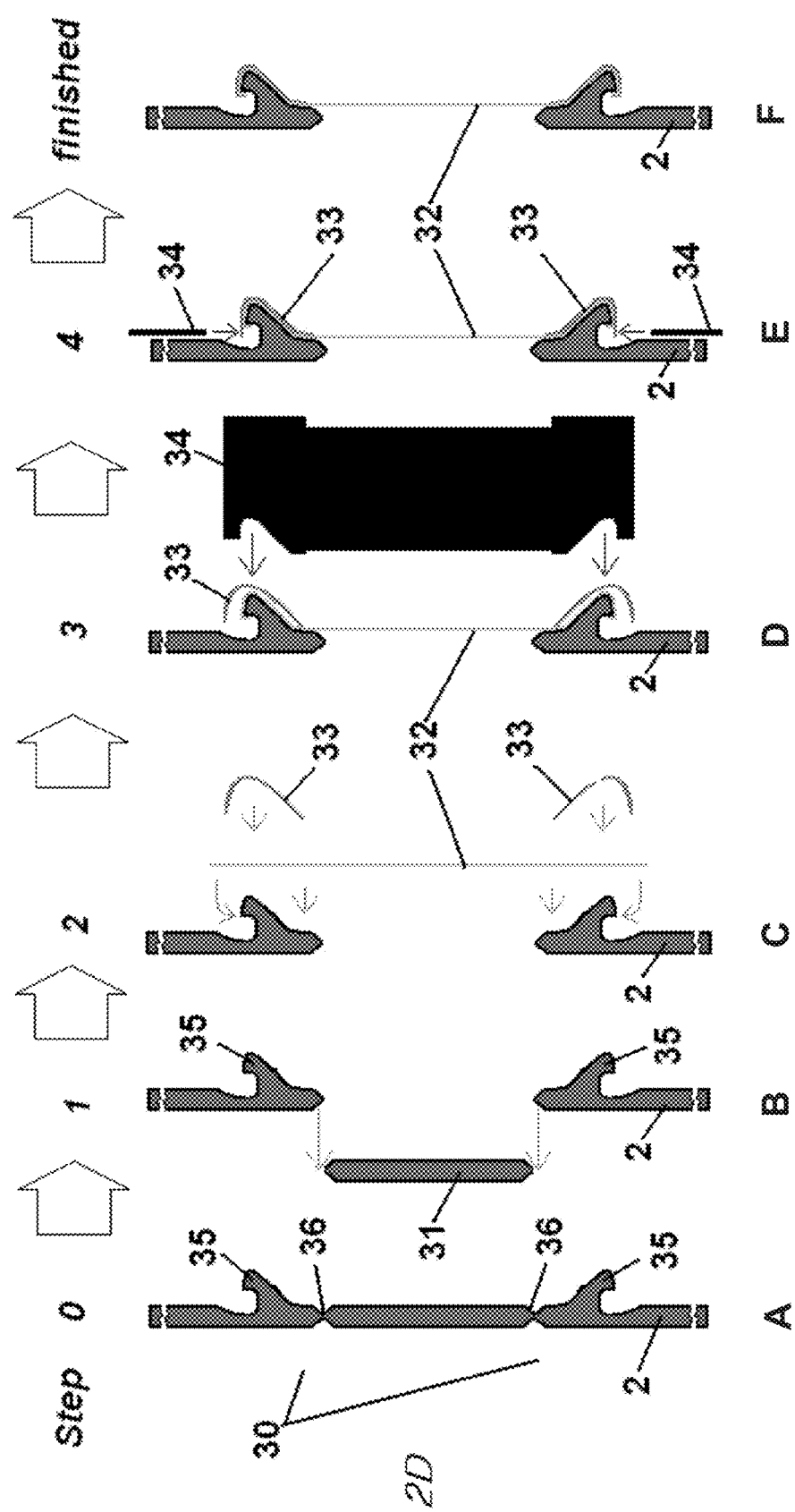
FIG. 22 shows sectional views A-F of a portion of a camera module, showing the process steps of assembling a membrane to the portion of the camera module in accordance with the present invention.

The breaking zone 36 (see FIG. 21B and FIG. 22A) may be provided by weakening the structure by making the material very thin or by perforation or partial perforation (without through holes). The removable element or lid 31 (break out piece) which may be broken out (see step 1 at "B" in FIG. 22) may be completely removed and disposed of or may be partially detached and folded inward or outward in a manner that does not disturb the assembly process and/or cause a rattle noise or the like. The structural element 30 may comprise a structural shape or lip 35 around the break out hole at which a crimp can be attached to retain the membrane at the hole and structural element and lip. In applications where the hole comprises a generally round hole, such as shown in FIGS. 20A, 20B and in a half cut in FIG. 22A, the crimping part 33 may be in shape of a ring formed in a way to align to the structural element's shape or lip 35, which is the counterpart (shoulder) to receive the crimp (see "C" in FIG. 22). The membrane 32 is placed at least in part between the crimping element or part 33 and the structure or lip 35 (see "C" in FIG. 22 and see FIG. 22A). The crimping part may be crimped in one or two steps (such as best seen in FIGS. 22C and 22D) around the structural element 35 by crimping tools 34 (see steps 3 and 4 at "D" and "E" in FIG. 22, where a first tool, at "D", presses the crimping part against the lip 35 and membrane 32, and a second tool, at "E", folds the perimeter edge regions of the crimping part over at the lip 35). The finished part at "F" in FIG. 22 and the sectional views of FIGS. 22C and 22D, and the views of FIGS. 20A and 20B, show the membrane 32 as finally assembled at the bottom structure 2. In cases where no membrane may be needed for keeping the camera dry (in its specific application), the break out lid 31 may be kept in place, and no alternative tool for forming the structure will be needed for cameras having that option.

By using of a crimping part for assembling the lens holder to the housing, the present invention provides a wider range of suitable material selection. For example, the camera module may comprise a lens holder and housing that are made from a plastic or polymeric material or that are made from a die casting metal or the like. For example, the components may comprise PPS with steel fibers (PPS-SF) or PPS that is not laser transparency, or a die casting metal in zinc or magnesium or the like. The typically more expensive metal coating for the plastic parts for EMC (electromagnetic compatibility) can be saved or avoided, when the components comprise a die casting metal in zinc or magnesium or the like. Also, the heat dissipation and EMC properties of the die casting metal parts are enhanced over the properties of the plastic materials. Also, investment costs for a steel crimping plant are much reduced as compared to those for a laser welding plant.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012 and published Jun. 6, 2013 as International Publication No. WO 2013/081984, which is hereby incorporated herein by reference in its entirety.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012 and published Feb. 7, 2013 ad International Publication No. WO 2013/019707, and/or PCT Application No. PCT/US2012/048110, filed Jul. 25, 2012 and published Jan. 31, 2013 as International Publication No. WO 2013/016409, and/or PCT Application No. PCT/CA2012/000378, filed Apr. 25, 2012 and published Nov. 1, 2012 as International Publication No. WO 2012/145822, and/or PCT Application No. PCT/US2012/056014, filed Sep. 19, 2012 and published Mar. 28, 2013 as International Publication No. WO 2013/043661, and/or PCT Application No. PCT/US12/57007, filed Sep. 25, 2012 and published Apr. 4, 2013 as International Publication No. WO 2013/048994, and/or PCT Application No. PCT/US2012/061548, filed Oct. 24, 2012 and published May 2, 2013 as International Publication No. WO 2013/063014, and/or PCT Application No. PCT/US2012/062906, filed Nov. 1, 2012 and published May 10, 2013 ad International Publication No. WO 2013/067083, and/or PCT Application No. PCT/US2012/063520, filed Nov. 5, 2012 and published May 16, 2013 as International Publication No. WO 2013/070539, and/or PCT Application No. PCT/US2012/064980, filed Nov. 14, 2012 and published May 23, 2013 as International Publication No. WO 2013/074604, and/or PCT Application No. PCT/US2012/066570, filed Nov. 27, 2012 and published Jun. 6, 2013 as International Publication No. WO 2013/081984, and/or PCT Application No. PCT/US2012/066571, filed Nov. 27, 2012 and published Jun. 6, 2013 as International Publication No. WO 2013/081985, and/or PCT Application No. PCT/US2012/068331, filed Dec. 7, 2012 and published Jun. 13, 2013 as International Publication No. WO 2013/086249, and/or U.S. patent application Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. US-2013-0002873, and/or U.S. provisional applications, Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,878, filed Feb. 24, 2012; Ser. No. 61/602,876, filed Feb. 24, 2012; Ser. No. 61/600,205, filed Feb. 17, 2012; and/or Ser. No. 61/588,833, filed Jan. 20, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260, 400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670, 935; 5,760,962; 5,715,093; 5,877,897; 6,922,292; 6,757, 109; 6,717,610; 6,590,719; 6,201,642; 6,498,620; 5,796, 094; 6,097,023; 6,320,176; 6,559,435; 6,831,261; 6,806, 452; 6,396,397; 6,822,563; 6,946,978; 7,339,149; 7,038, 577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226, 628, filed Sep. 14, 2005 and published Mar. 23, 2006 as U.S. Publication No. US-2006-0061008, and/or Ser. No. 12/578, 732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370, 983; 7,329,013; 7,308,341; 7,289,037; 7,249,860; 7,004, 593; 4,546,551; 5,699,044; 4,953,305; 5,576,687; 5,632, 092; 5,677,851; 5,708,410; 5,737,226; 5,802,727; 5,878, 370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012 and published Nov. 1, 2012 as International Publication No. WO 2012/145822, and/or PCT Application No. PCT/US2012/066571, filed Nov. 27, 2012 and published Jun. 6, 2013 as International Publication No. WO 2013/081985, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; and/or Ser. No. 61/588,833, filed Jan. 20, 2012, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A method for assembling a camera module for use in a vision system for a vehicle, said method comprising:
providing a rear housing portion, said rear housing portion comprising a first mating surface and a first perimeter flange at least partially around said first mating surface, said first perimeter flange having a first securing surface opposite said first mating surface;
providing a front housing portion, said front housing portion comprising a second mating surface and a second perimeter flange at least partially around said second mating surface, said second perimeter flange having a second securing surface opposite said second mating surface;
providing a securing element having first and second tabs that extend from a center portion of said securing element;
with said first mating surface at said second mating surface, disposing said securing element along said first and second perimeter flanges;
bending said first and second tabs to overlap and engage said first and second securing surfaces of said first and second perimeter flanges, respectively; and
crimping said securing element at said first and second perimeter flanges to urge said first mating surface against said second mating surface to secure said rear housing portion relative to said front housing portion.

2. The method of claim 1, wherein the step of crimping said securing element comprises stretching said securing element.

3. The method of claim 1, wherein at least one of said rear housing portion and said front housing portion has a groove established at least partially at a location that is covered by said securing element, and wherein the step of crimping said securing element comprises deforming a portion of said securing element into said groove.

4. The method of claim 1, wherein, when said securing element is disposed along said first and second perimeter flanges and crimped at said first and second perimeter flanges, said center portion spans an interface where said first and second mating surfaces are mated together.

5. The method of claim 1, wherein said front housing portion comprises plastic.

6. The method of claim 1, wherein said rear housing portion comprises plastic.

7. The method of claim 1, wherein said front housing portion comprises metal.

8. The method of claim 1, wherein said rear housing portion comprises metal.

9. The method of claim 1, wherein said securing element comprises a single continuous metallic strip that circumscribes said first and second perimeter flanges.

10. The method of claim 1, wherein said securing element comprises a plurality of metallic strips, each of said metallic strips being disposed along a respective perimeter portion of said first and second perimeter flanges.

11. The method of claim 1, comprising providing a sealing element and disposing said sealing element at one of said first and second mating surfaces such that said sealing element is disposed between said first and second mating surfaces when said first and second mating surfaces are mated together.

12. The method of claim 11, wherein, when said first and second mating surfaces are mated together, said sealing element is disposed at least partially in a channel established along at least one of said first and second mating surfaces.

13. The method of claim 1, wherein said rear housing portion comprises an electrical connector for electrically connecting circuitry of said camera module to a power source of a vehicle.

14. The method of claim 1, wherein said front housing portion at least partially houses a lens assembly of said camera module.

15. The method of claim 1, comprising removing a breakout element of said rear housing portion to provide an aperture at said rear housing portion, and disposing a membrane at said aperture after said breakout element is removed from said rear housing portion, and retaining said membrane at said aperture via crimping a crimping element over a perimeter portion of said membrane and a flange of said rear housing portion that is formed around said aperture, and wherein said membrane comprises a breathable material that allows for moisture to escape said rear housing portion while limiting water intrusion into said camera module, and wherein said crimping element comprises a generally ring-shaped element that is disposed at said flange, and wherein the step of crimping said crimping element comprising crimping an outer periphery of said generally ring-shaped element around a portion of said flange to retain said membrane at said rear housing portion.

16. A method for assembling a camera module for use in a vision system for a vehicle, said method comprising:
    providing a rear housing portion, said rear housing portion comprising a first mating surface and a first perimeter flange at least partially around said first mating surface, said first perimeter flange having a first securing surface opposite said first mating surface;
    providing a front housing portion, said front housing portion comprising a second mating surface and a second perimeter flange at least partially around said second mating surface, said second perimeter flange having a second securing surface opposite said second mating surface;
    providing a sealing element and disposing said sealing element at one of said first and second mating surfaces;
    providing a securing element having first and second tabs that extend from a center portion of said securing element;
    with said first mating surface at said second mating surface, disposing said securing element along said first and second perimeter flanges;
    bending said first and second tabs to overlap and engage said first and second securing surfaces of said first and second perimeter flanges, respectively;
    crimping said securing element at said first and second perimeter flanges to urge said first mating surface against said second mating surface to secure said rear housing portion relative to said front housing portion;
    wherein, when said securing element is disposed along said first and second perimeter flanges and crimped at said first and second perimeter flanges, said sealing element is disposed between said first and second mating surfaces when said first and second mating surfaces are mated together; and
    wherein, when said securing element is disposed along said first and second perimeter flanges and crimped at said first and second perimeter flanges, said center portion spans an interface where said first and second mating surfaces are mated together.

17. The method of claim 16, wherein the step of disposing said sealing element comprising disposing said sealing element at least partially in a channel established along at least one of said first and second mating surfaces.

18. The method of claim 16, wherein said securing element comprises a single continuous metallic strip that circumscribes said first and second perimeter flanges.

19. The method of claim 16, wherein said securing element comprises a plurality of metallic strips, each of said metallic strips being disposed along a respective perimeter portion of said first and second perimeter flanges.

20. A method for assembling a camera module for use in a vision system for a vehicle, said method comprising:
    providing a rear housing portion, said rear housing portion comprising a first mating surface and a first perimeter flange at least partially around said first mating surface, said first perimeter flange having a first securing surface opposite said first mating surface, wherein said rear housing portion comprises an electrical connector for electrically connecting circuitry of said camera module to a power source of a vehicle;
    providing a front housing portion, said front housing portion comprising a second mating surface and a second perimeter flange at least partially around said second mating surface, said second perimeter flange having a second securing surface opposite said second mating surface, wherein said front housing portion at least partially houses a lens assembly of said camera module;
    providing a securing element having first and second tabs that extend from a center portion of said securing element;
    with said first mating surface at said second mating surface, disposing said securing element along said first and second perimeter flanges;
    bending said first and second tabs to overlap and engage said first and second securing surfaces of said first and second perimeter flanges, respectively;
    crimping said securing element at said first and second perimeter flanges to urge said first mating surface against said second mating surface to secure said rear housing portion relative to said front housing portion;
    wherein, when said securing element is disposed along said first and second perimeter flanges and crimped at said first and second perimeter flanges, said center portion spans an interface where said first and second mating surfaces are mated together; and
    wherein, when said securing element is disposed along said first and second perimeter flanges and crimped at said first and second perimeter flanges, said first and second mating surfaces are mated together to seal said camera module.

* * * * *

UNITED STATES PATENT AND TRADEMARK OFFICE
CERTIFICATE OF CORRECTION

PATENT NO. : 9,819,845 B2
APPLICATION NO. : 15/344866
DATED : November 14, 2017
INVENTOR(S) : Hartmut Winter et al.

Page 1 of 1

It is certified that error appears in the above-identified patent and that said Letters Patent is hereby corrected as shown below:

In the Specification

Column 5
Line 41, "76" should be --7B--

Column 6
Line 19, "Fluoroscone" should be --Fluorosilicone--
Line 30, "Kopp" should be --Köpp--

Column 10
Line 51, Insert --; 5,877,897; 6,498,620; 5,670,935; 5,796,094-- after "5,550,677"

Signed and Sealed this
Twenty-third Day of October, 2018

Andrei Iancu
*Director of the United States Patent and Trademark Office*